United States Patent [19]

Tennant et al.

[11] 4,110,213

[45] Aug. 29, 1978

[54] COMPOSITIONS AND PROCESSES FOR THE DISPERSING OF OIL SPILLAGES

[75] Inventors: David John Tennant; Geoffrey Philip Sheridan, both of Manchester; Alistair James Steel, Stockport, all of England

[73] Assignee: Lankro Chemicals Group Limited, Manchester, England

[21] Appl. No.: 739,993

[22] Filed: Nov. 8, 1976

[30] Foreign Application Priority Data

Nov. 7, 1975 [GB] United Kingdom ............... 46255/75

[51] Int. Cl.$^2$ ........................ B01D 17/02; C02B 1/18; B01F 17/36

[52] U.S. Cl. ............................. 210/59; 210/DIG. 27; 252/170; 252/312; 252/356; 252/DIG. 1

[58] Field of Search ............................. 252/312, 356; 210/DIG. 27, 59

[56] References Cited

U.S. PATENT DOCUMENTS 2,573,599  10/1951  Price ..................................... 252/312
3,998,733  12/1976  Blanchard et al. ............... 252/312 X

FOREIGN PATENT DOCUMENTS 2,356,092  5/1974  Fed. Rep. of Germany ... 210/DIG. 27
1,418,374  12/1975  United Kingdom ............ 210/DIG. 27

*Primary Examiner*—Richard D. Lovering
*Attorney, Agent, or Firm*—Young & Thompson

[57] ABSTRACT

The invention relates to processes for dispersing oil spillages using compositions prepared by on-site dilution of concentrates containing as emulsifying agent an aliphatic carboxylic acid polyoxyalkylene glycol monoester, as solvent an aryl or aliphatic dicarboxylic acid monohydric aliphatic alcohol ester, and as pour-point depressant an alkylene, or polyoxyalkylene, glycol monoalkyl ether. These concentrates are physically and chemically stable to a wide range of temperatures, and may easily be diluted with water, especially sea-water, immediately prior to application, without any risk of gellation or an unacceptable viscosity increase, to give a use composition.

27 Claims, No Drawings

COMPOSITIONS AND PROCESSES FOR THE DISPERSING OF OIL SPILLAGES

BACKGROUND OF THE INVENTION

1. Field of the Invention

This invention is concerned with compositions and processes for the dispersing of oil spillages. More specifically, the invention relates to the dispersal of oil spillages using aqueous emulsifier compositions prepared by the on-site dilution of suitable concentrates consisting of an emulsifier, a solvent and a pour-point depressant.

2. Description of prior art

There have been considerable advances in the art of treating oil spillages since the Torrey Canyon disaster off Cornwall in 1967. For example, it soon became apparent that the compositions used caused undesirable damage to marine life, primarily because of the extreme toxicity of the aromatic solvents used therein. The subsequent replacement of the aromatic solvents by an odourless kerosene containing less than 3% aromatics and/or isopropanol greatly reduced the toxic hazard. The newer solvents, however, in themselves produced problems; they were relatively volatile, and led to explosion and fire hazards. In addition they were relatively poor solvents for the active ingredient (which in general was the mono oleic acid ester of a polyethylene glycol), and their poor solvent power meant that compositions prepared therefrom tended to separate into two layers on storage as well as being unable to hold sufficient of the active ingredient. As a result, considerable stocks and storage facilities were necessary, and the boats carrying out the spraying operation had only short working periods at sea, and needed constant replenishing with the dispersant.

More recently, proposals have been made for detergent concentrates which may be diluted on site with sea water or fresh water. Unfortunately, while overcoming many of the problems of the earlier compositions, the newer concentrates have proved rather less effective in actually dispersing the oil at sea. Processes employing compositions of the kind described above are described and claimed in a number of earlier Patent Specifications. British Specification (Shell) No. 1,280,259 is believed to be the first to point to the use of aliphatic carboxylic acid polyoxyethylene glycol mono-esters as the emulsifier, but suggests that these materials should be dissolved in hydrocarbon solvents (such paraffins or naphthenes) containing up to 10 wt. % aromatic material. In the later I.C.I. British Specification No. 1,338,391 there is described the use of similar emulsifying fatty acid polyoxyalkylene glycol mono-esters, but again it is suggested that the solvents to be used with these emulsifiers should be hydrocarbons (including aromatic materials) or simple alcohols such as isopropanol. A very similar disclosure is made in I.C.I.'s British Specification No. 1,338,385 and again in I.C.I.'s British Specification No. 1,342,591.

BP British Specification No. 1,399,860 describes the use of emulsifying fatty acid polyoxyethylene glycol esters, but again suggests that these emulsifiers should be used in conjunction with a hydrocarbon solvent, while I.C.I.'s British Specification No. 1,343,401 is another describing the use of materials very similar to those mentioned in the aforesaid British Specification No. 1,338,391.

In Dasic's British Specification No. 1,404,684 there is one of the first disclosures of the use, as emulsifiers, of mixtures of fatty acid polyoxyalkylene glycol esters together with fatty acid sorbitan esters. However, even here it is still suggested that the solvent to be employed is a hydrocarbon, albeit with less than 3 wt. % aromatic material. This Specification also points out the desirability of using a cloud point depressant (pour point depressant).

Finally, Canevari's (Esso's) U.S. Pat. No. 3,793,218 describes in detail the use of multi-part emulsifier compositions containing, among other possible components, certain fatty acid sorbitan esters, certain sorbitan/polyoxyalkylene glycol adducts, and certain dialkyl sulphosuccinate salts. But again it is suggested that these emulsifiers should be used together with a solvent which is a hydrocarbon.

SUMMARY OF THE INVENTION

The present invention seeks to provide compositions and processes for the dispersing of spilled oil, wherein the compositions are substantially non-toxic, to marine life or, at least less toxic than the prior art compositions, may generally be diluted with sea water without gelation (or increase in viscosity), are efficient in dispersing the spilled oil, are of a relatively concentrated nature, and are substantially free from fire hazard.

Accordingly the present invention provides a concentrate for use in the dispersion of oil spillages which concentrate is substantially free from hydrocarbon solvent and comprises from 20 to 75% by weight of an emulsifying agent, which is a mono-ester of an aliphatic carboxylic acid and a polyoxy-alkylene glycol and has the general formula:

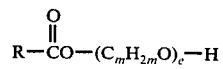

wherein R is the aliphatic hydrocarbyl radical of a fatty acid containing from 10 to 22 carbon atoms, $m$ is an integer from 2 to 4, there being at least one $(C_2H_4O)$ group per molecule, and $e$ is an integer of at least 2;

from 77 to 15% by weight of a solvent which is a diester of an acid selected from the group consisting of aryl and alkyl dicarboxylic acids, with at least one monohydric aliphatic alcohol, and has the general formula:

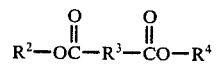

wherein $R^2$ and $R^4$ are independently aliphatic hydrocarbyl radicals containing from 5 to 13 carbon atoms, and

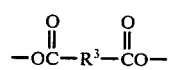

is the diacyloxy radical of an acid selected from the group consisting of aromatic and aliphatic carboxylic acids and at least 3% by weight of a pour point depressant which is a monoalkyl ether of a glycol selected from the group consisting of alkylene glycols and polyoxyalkylene glycols and has the general formula:

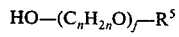

wherein $n$ is an integer of from 2 to 4, $f$ is an integer of from 1 to 5, and $R^5$ is an alkyl radical containing from 1 to 6 carbon atoms.

DESCRIPTION OF PREFERRED EMBODIMENTS

The emulsifiers I are present to emulsify the oil which the compositions are to treat. They are preferably the monoesters of the aliphatic carboxylic acids having from 12 to 18 carbon atoms, more particularly those of the unsaturated fatty acids (these latter tend to give emulsifiers which are liquid at ambient temperatures). Examples of suitable aliphatic carboxylic acids are lauric ($C_{12}$ saturated), myristic ($C_{14}$ saturated), palmitic ($C_{16}$ saturated), oleic ($C_{18}$ unsaturated), linoleic ($C_{18}$ unsaturated), and linolenic ($C_{18}$ saturated) acids, and mixtures of these such as might be derived from soya bean oil, linseed oil, fish oil, distilled tall oil and coconut oil.

The preferred glycol moieties of the emulsifier are those consisting of ethylene oxide units or containing predominantly ethylene oxide units with a minor proportion of propylene oxide or butylene oxide units. The mole weight of the polyoxyalkylene glycol is preferably between 100 and 600, more especially between 200 and 400, and particularly preferred polyoxyalkylene glycols are those which contain either ethylene oxide residues only or mixtures of ethylene oxide with smaller amounts of propylene oxide residues.

A particularly preferred emulsifier is the monooleate of a 300 mole weight polyoxyethylene glycol (such as is available under the name ETHYLAN A3).

The amounts of emulsifier and solvent are generally connected, more of one being employed with less of the other. For reasons of efficiency it is preferred to use at least 30% by weight emulsifier (and not more than 65% by weight solvent), while for reasons of economy it is in general of little value to use more than 60% by weight emulsifier (and less than 30% by weight solvent). A preferred emulsifier range is from 35 to 55% by weight (with a corresponding solvent range of from 60 to 35% by weight solvent).

The solvents II are primarily present to aid the initial dispersion of the emulsifiers in the oil to be treated. Preferably they are the diesters of aryl or alkyl dicarboxylic acids containing from 5 to 10 carbon atoms, especially the aryl dicarboxylic acids containing 8 carbon atoms or the aliphatic dicarboxylic acids containing from 6 to 10 carbon atoms. The particularly preferred dicarboxylic acids are phthalic acid ($C_8$), adipic acid ($C_6$), azelaic acid ($C_9$) and sebacic acid ($C_{10}$).

The preferred alcohols used to form the diester solvents are the saturated monohydric alcohols containing from 5 to 13 carbon atoms, such as ethyl-hexyl, octyl, isooctyl, nonyl and tri-decyl alcohols (all usually available as mixtures with the specified alcohol as the major component).

Particularly preferred solvents are di(iso-octyl) phthalate, dinonyl phthalate, dioctyl adipate, di(isooctyl) sebacate, di(tri-decyl) adipate and di(iso-octyl) azelate.

Preferred amounts of solvent are discussed above in connection with the preferred amounts of emulsifier.

The pour point depressant III is present to maintain the liquidity and stability of the composition even at very low temperatures. It is preferably a monoalkyl ether of ethylene glycol or a polyoxyethylene glycol ($n$ = 2) – these compounds are partially soluble in water – and preferably has a boiling point above 150° C and a flash point in excess of 60° when determined in a Pensky Marten closed cup. The pour point depressant may with advantage be ethylene glycol mono butyl ether, diethylene glycol mono ethyl ether, or mixtures of these.

The amount of pour point depressant employed depends primarily on the degree of low temperature stability required–the greater the degree the more depressant should be used. However, little additional effect is seen when using more than 15% by weight and indeed a convenient amount is 10% by weight.

In an especially preferred form of the invention the concentrate is a three-part mixture consisting of 30 to 40 wt % of emulsifier I, 65 to 50 wt % of solvent II and 5 to 10 wt % of pour point depressant III. A particularly preferred concentrate comprises 35 wt % emulsifier I (the monooleate of a 300 mole weight polyoxyethylene glycol), 55 wt % solvent II (di [iso-octyl] phthalate) and 10 wt % pour point depressant III (ethylene glycol monobutyl ether).

Current methods of dispersing oil slicks involve spraying on to the slick an emulsifier composition, and then mechanically mixing the oil emulsifier combination with the water on which the slick has formed so as to make an oil-in-water emulsion which will itself gradually disperse under the action of wind and waves. The concentrate compositions of the invention are intended for use in such a method, after first being diluted to an appropriate use level (usually about one tenth). Accordingly in another aspect this invention provides a process for the dispersal of an oil spillage, in which process a concentrate composition of the invention is diluted with water and applied to and mixed with the oil spillage.

Where the oil spillage is a sea-borne oil slick, the dilution water will most conveniently be sea-water, and a suitable dilution rate will be from five to fifteen, preferably ten, times.

The concentrates of the invention can be applied to the oil in all conventional manners, and with or without severe dilution. However, the particular virtue of the inventive concentrates is that they can safely be diluted with sea water prior to spray application to an oil slick (the normal spray pump which is used for spraying dispersants on to oil slicks is modified to draw sea water from over the side of the spraying vessel and inject the dispersant composition described into the input side of the spray pump by appropriate means; the injection pump rate to the spray pump rate of delivery is at such a relative rate as to allow whatever dilution rate is required). The compositions diluted with water are sprayed on to the surface of the oil which is then agitated to break the resulting mixture into small droplets and thus disperse the oil.

The concentrate compositions of the present invention are especially suited to dilution with sea water as the diluted mixtures become very much less viscous. This is in contradistinction to the earlier types of oil slick dispersants (using odourless kerosene), which become more viscous, and ultimately gell, when mixed with sea water.

Although the process of the invention is of especial advantage when applied to the dispersion of oil slicks at sea, it may also be useful, modified as appropriate, in dispersing oil spillages such as those which are found on oil rigs or which have been washed on to rocks and beaches.

The following Examples are now given, though only by way of illustration, to show details of the compositions and processes of the invention. All percentages or parts referred to are by weight, unless otherwise indicated.

In certain of the Examples there are given results of laboratory Emulsion Tests designed to show the ability of the concentrate compositions of the invention, after dilution, to disperse oil. The Test procedure is not identical to what happens when an oil slick is sprayed, but is closely analogous thereto. Its essential features are as follows (all parts are by volume):

(A) Three samples of concentrate are diluted with synthetic sea water by different amounts:
  (1) One part concentrate to one part synthetic sea water; 1 part mixture contains 0.5 parts concentrate;
  (2) One part concentrate to four parts synthetic sea water; 1 part mixture contains 0.2 parts concentrate; and
  (3) One part concentrate to nine parts synthetic sea water; 1 part mixture contains 0.1 parts concentrate.

The synthetic sea water was prepared by dissolving British Drug House Sea Water Corrosion Test Tablets in deionised water.

This part of the test is analogous to the on-board pump mixing of a concentrate with sea water.

(B) After this dilution, each formed composition is shaken with a heavy grade fuel oil in the ratio of:
  (I) One part oil to one part diluted mixture (1) of the composition; thus, 0.5 parts concentrate per part oil;
  (II) One part oil to two parts diluted mixture (2) of the composition; thus, 0.4 parts concentrate per part oil; and
  (III) One part oil to four parts diluted mixture (3) of the composition thus, 0.4 parts concentrate per part oil.

This part of the Test is analogous to the high-pressure spraying of the diluted mixture onto the oil slick surface (the emulsifier I – rather more soluble in oil than in water – dissolves in the oil, aided by the solvent II).

(C) Finally, each mixture/oil combination is mixed with a large volume of synthetic sea water.

Ninety five parts of synthetic sea water are placed in an empty 100 milliliter stopped cylinder, and five parts of mixture/oil combination (I, II, or III above) are added. The cylinder is then violently shaken (for a total of twenty shakes), and the resulting emulsion/dispersion assigned a grading according to the following key:

Very good: A very good emulsion which is light brown in colour, and in which no particles are visible to the naked eye. The emulsion is stable, or a small oil layer separates out after about half an hour but is easily re-dispersed.

Good: A good emulsion which is light to dark brown in colour. Some fine oil particles may be visible to the naked eye. The emulsion is not so stable as in the "Very good" grade.

Fair: A fair emulsion which is dark brown in colour, and in which small oil particles can be seen. An oil layer normally separates out within a few minutes, but can be re-dispersed.

Poor: A poor emulsion which is grey-black in colour. Large particles and globules of oil are present. An oil layer separates immediately, which is re-dispersed only with difficulty.

This part of the Test is analogous to the mechanical agitation of the sprayed oil slick to mix it with, and disperse it in, the underlying sea water.

One purpose of this Test is to investigate whether any particular concentrate is better employed by application of large amounts of highly diluted concentrate or of smaller amounts of a less highly diluted concentrate. It will be observed that the actual amounts of concentrate per part oil in diluted mixture/oil combinations I, II and III (0.5, 0.4 and 0.4 parts respectively) are effectively constant; both the dilutions and the amounts of the mixtures applied progressively increase from combination I to combination III.

EXAMPLE I

This example demonstrates the function of the pour point depressant to secure a concentrate which has a low cloud point, and is therefore both stable and liquid at zero or sub-zero temperatures.

A series of concentrates was made, each concentrate consisting of:

35% Ethylan A3 [polyoxyethylene glycol mono-oleate (average molecular weight of polyoxyethylene glycol, 300)] as Emulsifier I, together with varying amounts of ethylene glycol monobutyl ether (butyl oxitol) (0%, 5%, 10% or 15%) as pour point depressant III the remainder being di(iso-octyl) phthalate (D.I.O.P.) as solvent II.

The cloud point test results are shown in Table 1 below:

Table 1.

| Concentrate | Ethylene Glycol Monobutyl ether % | Cloud Point (° C.) |
| --- | --- | --- |
| O₁(Comparative) | 0 | 10 |
| A₁ | 5 | −18 |
| A₂ | 10 | −20 |
| A₃ | 15 | −21 |

The results show how a concentrate which does not contain a pour point depressant exhibits temperature instability, separation occurring at temperatures well above 0° C. Further, the results demonstrate how addition of a pour point depressant enhances the stability to a marked and acceptable degree.

EXAMPLE 2

This Example demonstrates the effectiveness of concentrates containing various different solvents II.

(1) The following concentrates were prepared:

| Concentrate A₂ (as in Example 1) | | |
| --- | --- | --- |
| Emulsifier I: | Ethylan A3 | 35% wt. |
| Solvent II: | D.I.O.P. | 55% wt. |
| Pour Point Depressant III: | Butyl oxitol | 10% wt. |
| Concentrate B | | |
| Emulsifier I: | Ethylan A3 | 35% wt. |
| Solvent II: | Di(iso-octyl) adipate | 55% wt. |
| Pour Point Depressant III | Butyl oxitol | 10% wt. |
| Concentrate C | | |
| Emulsifier I: | Ethylan A3 | 35% wt. |
| Solvent II: | Di(iso-octyl) azelate | 55% wt. |
| Pour Point Depressant III: | Butyl oxitol | 10% wt. |
| together with a comparative concentrate, Concentrate W. | | |
| Concentrate W | | |
| | Ethylan A3 | 35% wt. |
| | Kerosene* | 55% wt. |

-continued

| | | |
|---|---|---|
| Butyl oxitol | | 10% wt. |

*The Kerosene used is an industrial grade with aromatic content of 2.5% vol. max.

The physical properties of these concentrates are shown in Table 2 below:

Table 2

| Properties | Concentrate | | | |
|---|---|---|---|---|
| | $A_2$ | B | C | W |
| Viscosity in centistokes at 0° C | 157 | 53 | 63 | 17 |
| at 20° C | 43 | 21 | 25 | 8 |
| Cloud Point (° C) | −20.0 | −17.0 | −16.5 | −14.5 |
| Flash Point (° C) | | | | |
| Abel closed cup | 80 | 79 | 79 | 60 |
| Cleveland open cup | 101 | 89 | 89 | 75 |

Table 3 below lists results which demonstrate the behaviour of the concentrates when diluted with sea water. The Table shows the viscosities in centistokes as measured in a U-tube viscometer at 20° C., and it is seen that only comparative Composition W increases rapidly in viscosity on dilution and forms a gel when mixed with 10 times its own volume of sea water.

Table 3

| Dilution with sea water Concentrate | Viscosities at 20° C. (centistokes) | | | | |
|---|---|---|---|---|---|
| | Equal volume | 2 times volume | 6 times volume | 10 times volume | 20 times volume |
| $A_2$ | 55 | 9 | 2 | 2 | 1 |
| B | 17 | 4 | 2 | 1 | 1 |
| C | 18 | 4 | 2 | 1 | 1 |
| W | 83 | 217 | 1,318 | gel | gel |

2. The concentrates were tested by the Emulsion Test explained above.

The results are shown in Table 4 below:

Table 4

| Concentrate | Dilution | Grading |
|---|---|---|
| | 1:1 | I | Very Good |
| $A_2$ | 4:1 | II | Good |
| | 9:1 | III | Good |
| | 1:1 | I | Very Good |
| B | 4:1 | II | Good |
| | 9:1 | III | Fair |
| | 1:1 | I | Very Good |
| C | 4:1 | II | Good |
| | 9:1 | III | Fair |

These results show that the concentrates are successful and acceptable emulsifiers of fuel oil. Furthermore, they suggest that better emulsification is obtained by using small amounts of a fairly concentrated emulsifier than by using larger amounts of a more dilute emulsifier.

EXAMPLE 3

This Example demonstrates the use of concentrates similar to those of Example 2 but with different amounts of constituents.

(1) A series of concentrates was made, as follows:

| Concentrate $A_4$ | | |
|---|---|---|
| Emulsifier I: | Ethylan A3 | 70% wt. |
| Solvent II: | D.I.O.P. | 20% wt. |
| Pour Point Depressant III: | Butyl Oxitol | 10% wt. |
| Concentrate $A_5$ | | |
| Emulsifier I: | Ethylan A3 | 75% wt. |
| Solvent II: | D.I.O.P. | 15% wt. |
| Pour Point Depressant III: | Butyl Oxitol | 10% wt. |
| Concentrate X (a Comparison concentrate) | | |
| Emulsifier I: | Ethylan A3 | 15% wt. |
| Solvent II: | D.I.O.P. | 80% wt. |
| Pour Point Depressant III: | Butyl Oxitol | 5% wt. |

(2) Each concentrate was then subjected to the Emulsion Test as outlined above. The results are shown in Table 5 below. The Table also reports the results previously obtained for concentrate $A_2$.

Table 5

| Concentrate | Dilution | | Grading |
|---|---|---|---|
| | 1:1 | I | Very Good |
| $A_2$ | 4:1 | II | Good |
| | 9:1 | III | Good |
| | 1:1 | I | Good |
| $A_4$ | 4:1 | II | Good |
| | 9:1 | III | Fair |
| | 1:1 | I | Good |
| $A_5$ | 4:1 | II | Good |
| | 9:1 | III | Good |
| | 1:1 | I | Fair |
| x | 4:1 | II | Fair |
| | 9:1 | III | Poor |

These results demonstrate that the use of amounts of emulsifier I and solvent II within the stated preferred ranges appear to give better emulsification.

EXAMPLE 4

This Example shows the use of concentrates containing other emulsifiers I.

(1) The following concentrates were prepared:

| Concentrate E | | |
|---|---|---|
| Emulsifier I: | Ethylan L3 (a mono-laurate of a 300 mole weight polyoxy-ethylene glycol) | 35% wt. |
| Solvent II: | D.I.O.P. | 55% wt. |
| Pour Point Depressant III: | Butyl Oxitol | 10% wt. |
| Concentrate F | | |
| Emulsifier I: | Ethylan A4 (a mono-oleate of a 400 mole weight polyoxy-ethylene glycol | 35% wt. |
| Solvent II: | D.I.O.P. | 55% wt. |
| Pour Point Depressant III | Butyl Oxitol | 10% wt. |

(2) Each concentrate was subjected to the Emulsion Test described above.

The results are shown in Table 6 below. Table 6 also repeats the results from the previously tested concentrate $A_2$.

Table 6

| Concentrate | Dilution | | Grading |
|---|---|---|---|
| | 1:1 | I | Good |
| E | 4:1 | II | Good |
| | 9:1 | III | Good |
| | 1:1 | I | Fair |
| F | 4:1 | II | Fair |
| | 9:1 | III | Fair |
| | 1:1 | I | Very good |
| $A_2$ | 4:1 | II | Good |
| | 9:1 | III | Good |

EXAMPLE 5

This Example shows the use of concentrates containing another solvent II, the amounts of the constituents being varied. The Example is comparable to Example 3 above.

(1) The following concentrates were prepared:

| Concentrate $J_1$ | | |
|---|---|---|
| Emulsifier I: | Ethylan A3 | 20% wt. |
| Solvent II: | Di(tridecyl)phthalate (D.T.D.P.) | 70% wt. |
| Pour Point Depressant III: | Butyl Oxidol | 10% wt. |
| Concentrate $J_2$ | | |
| Emulsifier I: | Ethylan A3 | 35% wt. |
| Solvent II: | D.T.D.P. | 55% wt. |
| Pour Point Depressant III: | Butyl Oxitol | 10% wt. |
| Concentrate $J_3$ | | |
| Emulsifier I: | Ethylan A3 | 45% wt. |
| Solvent II: | D.T.D.P. | 45% wt. |
| Pour Point Depressant III: | Butyl Oxitol | 10% wt. |
| Concentrate $J_4$ | | |
| Emulsifier I: | Ethylan A3 | 65% wt. |
| Solvent II: | D.T.D.P. | 25% wt. |
| Pour Point Depressant III: | Butyl Oxitol | 10% wt. |

(2) Each concentrate was subjected to the Emulsion Test described above. The results are shown in Table 7 below.

| Concentrate | Dilution | Grading |
|---|---|---|
| | 1:1 | I | Very Good |
| $J_1$ | 4:1 | II | Very Good |
| | 9:1 | III | Very Good |
| | 1:1 | I | Very Good |
| $J_2$ | 4:1 | II | Very Good |
| | 9:1 | III | Good |
| | 1:1 | I | Very Good |
| $J_3$ | 4:1 | II | Very Good |
| | 9:1 | III | Very Good |
| | 1:1 | I | Good |
| $J_4$ | 4:1 | II | Good |
| | 9:1 | III | Good |

EXAMPLE 6: Sea trials and toxicity tests: Concentrate $A_2$ (1) A sea trial with Concentrate $A_2$ was carried out in calm conditions at a temperature of 90° C. A dilution of 1 part concentrate with 9 parts of sea water was made continuously by pumping a stream of the concentrate and a stream of sea water through a mixing jet and spraying the resulting dilute composition on to a floating slick of Kuwait crude oil. It was estimated that the amount of diluted material sprayed was roughly equal to that of the oil content in the slick. The slick dispersed rapidly into small droplets which did not show signs of coalescing.

(2) The toxicity of Concentrate $A_2$ in sea water against the brown shrimp (Crangon crangon) was tested according to the method of Portman and Connor (Marine Biology 1967, Volume 1, part 4, pages 322–329). The $LC_{50}$ (48 hours) for Concentrate $A_2$ was greater than 10,000 parts per million (in fact, at 10,000 p.p.m. none of the test shrimps had died after 48 hours).

EXAMPLE 7: Toxicity tests: Concentrate B

Also tested for toxicity in sea water against the brown shrimp (Crangon crangon), by the same method mentioned in Example 6, was Concentrate B. The $LC_{50}$ (48 hours) for Concentrate B was greater than 10,000 part per million (in fact, at 10,000 p.p.m. none of the test shrimps had died after 48 hours).

We claim:

1. A concentrate for use in the dispersion of oil spillages, which concentrate is substantially free from hydrocarbon solvent and consists of:- from 20 to 75% by weight of an emulsifying agent, which is a mono-ester of an aliphatic carboxylic acid and a polyoxyalkylene glycol and has the general formula $$R-CO-(C_mH_{2m}O)_e-H \qquad I$$

wherein R is the aliphatic hydrocarbyl radical of a fatty acid containing from 10 to 22 carbon atoms, m is an integer from 2 to 4, there being at least one ($C_2H_4O$) group per molecule, and e is an integer of at least 2; from 77 to 15% by weight of a solvent which is a diester of an acid selected from the group consisting of aryl and alkyl dicarboxylic acids, with at least one monohydric aliphatic alcohol, and has the general formula $$R^2-OC-R^3-CO-R^4 \qquad II$$

wherein $R^2$ and $R^4$ are independently aliphatic hydrocarbyl radicals containing from 5 to 13 carbon atoms, and $$-OC-R^3-CO-$$

is the diacyloxy radical of an acid selected from the group consisting of aromatic and aliphatic carboxylic acids and from 3 to 15% by weight of a pour point depressant which is a monoalkyl ether of a glycol selected from the group consisting of alkylene glycol and polyoxyalkylene glycols and has the general formula:

$$HO-(C_nH_{2n}O)_f-R^5 \qquad III$$

wherein n is an integer of from 2 to 4, f is an integer of from 1 to 5, and $R^5$ is an alkyl radical containing from 1 to 6 carbon atoms.

2. A concentrate as claimed in claim 1, wherein the emulsifier I is a monoester of an aliphatic carboxylic acid having from 12 to 18 carbon atoms.

3. A concentrate as claimed in claim 2 wherein the aliphatic carboxylic acid is an acid selected from the group consisting of lauric, myristic, palmitic, oleic, linoleic, and linolenic acid and mixtures of these acids.

4. A concentrate as claimed in claim 1, wherein the alcohol moiety of the emulsifier is a polyoxyalkylene glycol, containing from zero to a small proportion of groups selected from the group consisting of propylenoxy and butylenoxy groups.

5. A concentrate as claimed in claim 4, wherein the polyoxy-alkylene glycol has a molecular weight of between 200 and 400.

6. A concentrate as claimed in claim 1, wherein the solvent II is the diester of an acid selected from the group consisting of aryl dicarboxylic acids containing 8 carbon atoms and aliphatic dicarboxylic acids containing from 6 to 10 carbon atoms.

7. A concentrate as claimed in claim 6, wherein the acid selected from the group consisting of phthalic acid, adipic acid, azelaic acid, and sebacic acid.

8. A concentrate as claimed in claim 1 wherein the alcohol moiety of the diester solvent II is a saturated monohydric alcohol containing from 5 to 13 carbon atoms.

9. A concentrate as claimed in claim 8, wherein the alcohol is an alcohol selected from the group consisting of ethyl-hexyl, octyl, iso-octyl, nonyl and tridecyl alcohol.

10. A concentrate as claimed in claim 1, wherein there are from 35 to 55 parts emulsifier, and from 60 to 35 parts solvent.

11. A concentrate as claimed in claim 1, wherein the pour point depressant has a boiling point above 150° C, and a flash point in excess of 60° C when determined in a Pensky Marten closed cup.

12. A concentrate as claimed in claim 1 which is a three part mixture consisting of 30 to 40% by weight of an emulsifier of formula I that is the monooleate of a 300 molecular weight polyoxyethylene glycol; from 65 to 40% by weight of a solvent of formula II selected from the group consisting of di(iso-octyl) phthalate, dinonyl phthalate, dioctyl adipate, di(iso-octyl) sebacate, di(tridecyl) adipate and di(iso-octyl) azelate; and from 5 to 10% by weight of a pour point depressant of formula III which is selected from the group consisting of ethylene glycol mono-butyl ether, and diethylene glycol ether.

13. A process for the dispersal of an oil spillage, which process comprises diluting a concentrate composition which is substantially free from hydrocarbon solvent and consists of:- from 20 to 75% by weight of an emulsifying agent, which is a mono-ester of an aliphatic carboxylic acid and a polyoxy-alkylene glycol and has the general formula

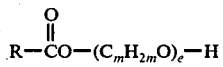  I wherein R is the aliphatic hydrocarbyl radical of a fatty acid containing from 10 to 22 carbon atoms, $m$ is an integer from 2 to 4, there being at least one ($C_2H_4O$) group per molecule, and $e$ is an integer of at least 2; from 77 to 15% by weight of a solvent which is a diester of an acid selected from the group consisting of aryl and alkyl dicarboxylic acids, with at least one monohydric aliphatic alcohol, and has the general formula

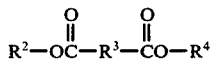  II wherein $R^2$ and $R^4$ are independently aliphatic hydrocarbyl radicals containing from 5 to 13 carbon atoms, and

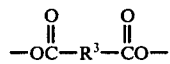

is the diacyloxy radical of an acid selected from the group consisting or aromatic and aliphatic carboxylic acids and from 3 to 15% by weight of a pour point depressant which is a monoalkyl ether of a glycol selected from the group consisting of alkylene glycol and polyoxyalkylene glycols and has the general formula $HO-(C_nH_{2n}O)_f-R^5$  III wherein $n$ is an integer of from 2 to 4, $f$ is an integer of from 1 to 5, and $R^5$ is an alkyl radical containing from 1 to 6 carbon atoms, with water, and applying the diluted concentrate to, and mixing the diluted concentrate with the oil spillage.

14. A process as claimed in claim 13, wherein the emulsifier I is a monoester of an aliphatic carboxylic acid having from 12 to 18 carbon atoms.

15. A process as claimed in claim 14, wherein the aliphatic carboxylic acid is an acid selected from the group consisting of lauric, myristic, palmitic, oleic, linoleic, linolenic acid and mixtures of these acids.

16. A process as claimed in claim 13, wherein the alcohol moiety of the emulsifier is a polyoxyalkylene glycol containing from zero to a small proportion of groups selected from the group consisting of propylenoxy and butylenoxy groups.

17. A process as claimed in claim 16, wherein the polyoxyalkylene glycol has a molecular weight of between 200 and 400.

18. A process as claimed in claim 13, wherein the solvent II is the diester of an acid selected from the group consisting of aryl dicarboxylic acids containing 8 carbon atoms and aliphatic dicarboxylic acids containing from 6 to 10 carbon atoms.

19. A process as claimed in claim 16, wherein the acid is selected from the group consisting of phthalic acid, adipic acid, azelaic acid, and sebacic acid.

20. A process as claimed in claim 13 wherein the alcohol moiety of the diester solvent II is a saturated monohydric alcohol containing from 5 to 13 carbon atoms.

21. A process as claimed in claim 20, wherein the alcohol is an alcohol selected from the group consisting of ethyl-hexyl, octyl, iso-octyl, nonyl and tridecyl alcohol.

22. A process as claimed in claim 13, wherein there is from 35 to 55% by weight emulsifier, and from 60 to 35% by weight solvent.

23. A process as claimed in claim 13, wherein the pour point depressant has a boiling point above 150° C, and a flash point in excess of 60° C when determined in a Pensky Marten closed cup.

24. A process as claimed in claim 13, wherein the concentrate is a three-part mixture consisting of 30 to 40% by weight of an emulsifier of formula I that is the monooleate of a 300 molecular weight polyoxyethylene glycol, from 65 to 40% by weight of a solvent of formula II selected from the group consisting of di(iso-octyl) phthalate, dinonyl phthalate, dioctyl adipate, di(iso-octyl) sebacate, di(tri-decyl) adipate and di(iso-octyl) azelate; and from 5 to 10% by weight of a pour point depressant of formula III which is selected from the group consisting of ethylene glycol mono-butyl ether, and diethylene glycol ether.

25. A process as claimed in claim 13 in which the oil spillage is sea-borne oil slick and the dilution water is sea-water.

26. A process as claimed in claim 13, in which the dilution rate is from five to fifteen times.

27. A process as claimed in claim 26, in which the dilution rate is ten times.

* * * * *